(12) United States Patent
Neitzel et al.

(10) Patent No.: US 9,334,916 B2
(45) Date of Patent: May 10, 2016

(54) ROLL-OFF PISTON FOR AN AIR SPRING ROLLING-LOBE FLEXIBLE MEMBER

(71) Applicant: ContiTech Luftfedersysteme GmbH, Hannover (DE)

(72) Inventors: Eckard Neitzel, Hannover (DE); Dieter Offermann, Hannover (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 63 days.

(21) Appl. No.: 14/069,018

(22) Filed: Oct. 31, 2013

(65) Prior Publication Data

US 2014/0054833 A1 Feb. 27, 2014

Related U.S. Application Data

(63) Continuation of application No. PCT/EP2012/054321, filed on Mar. 13, 2012.

(30) Foreign Application Priority Data

May 4, 2011 (DE) .......................... 10 2011 050 103

(51) Int. Cl.
*F16F 9/05* (2006.01)
*B60G 11/27* (2006.01)

(52) U.S. Cl.
CPC ................ *F16F 9/057* (2013.01); *B60G 11/27* (2013.01); *F16F 9/052* (2013.01);
(Continued)

(58) Field of Classification Search
CPC ................ F16F 5/00; F16F 9/05; F16F 9/20; F16F 9/0209; F16F 9/0454; F16F 9/3214; A47C 3/30; B60G 2206/424; B60G 2202/152; B60G 2204/126

USPC ................................................ 267/124, 64.27
See application file for complete search history.

(56) References Cited

U.S. PATENT DOCUMENTS 2,926,011 A * 2/1960 Slemmons ............. B60G 11/27
  267/64.27
5,382,006 A * 1/1995 Arnold ................. B60G 17/052
  267/64.21

(Continued)

FOREIGN PATENT DOCUMENTS

DE 42 30 249 A1 3/1994
DE 200 23 582 U1 12/2004

(Continued)

OTHER PUBLICATIONS

International Search Report dated May 4, 2012 of international application PCT/EP2012/054321 on which this application is based.

*Primary Examiner* — Robert A Siconolfi
*Assistant Examiner* — San Aung
(74) *Attorney, Agent, or Firm* — Walter Ottesen, P.A.

(57) ABSTRACT

A roll-off piston for an air spring rolling-lobe flexible member, the interior of the roll-off piston is connected to the interior of the air spring. The roll-off piston includes two parts, namely, a pot-shaped piston lower part and a piston upper part connected in an air-tight manner to the lower part. A support for a stop buffer is integrated in the roll-off piston. The support includes two interacting parts, of which one part is configured as part of the piston upper part and the other part is configured as part of the pot-shaped lower part and extends from the base thereof. Both support parts interact in order to absorb forces acting substantially axially.

13 Claims, 3 Drawing Sheets

(52) U.S. Cl.
CPC .. *B60G 2202/152* (2013.01); *B60G 2204/4502* (2013.01); *B60G 2206/424* (2013.01); *B60G 2206/8201* (2013.01); *B60G 2206/8207* (2013.01)

(56) References Cited

U.S. PATENT DOCUMENTS

| | | | | |
|---|---|---|---|---|
| 6,386,524 | B1* | 5/2002 | Levy | B60G 11/28 267/64.21 |
| 2009/0302514 | A1* | 12/2009 | Grabarz | B60G 11/27 267/64.27 |
| 2010/0127438 | A1* | 5/2010 | Eise | F16F 9/057 267/124 |
| 2012/0061887 | A1* | 3/2012 | Westnedge | B60G 11/27 267/64.24 |

FOREIGN PATENT DOCUMENTS

| | | |
|---|---|---|
| DE | 10 2005 052 801 A1 | 5/2007 |
| EP | 1 862 335 A1 | 12/2007 |
| JP | 2002-303346 A | 10/2002 |
| WO | WO 2007/104671 A1 | 9/2007 |
| WO | WO 2008/025517 A1 | 3/2008 |

* cited by examiner

US 9,334,916 B2

ROLL-OFF PISTON FOR AN AIR SPRING ROLLING-LOBE FLEXIBLE MEMBER

CROSS REFERENCE TO RELATED APPLICATIONS

This application is a continuation application of international patent application PCT/EP2012/054321, filed Mar. 13, 2012, designating the United States and claiming priority from German application 10 2011 050 103.7, filed May 4, 2011, and the entire content of both applications is incorporated herein by reference.

FIELD OF THE INVENTION

The invention relates to a roll-off piston for an air spring rolling-lobe flexible member. The roll-off piston is formed as a hollow plunger, wherein the interior space of the roll-off piston is connected to the interior space of the air spring. The roll-off piston is made of at least two parts and has a pot-shaped piston lower part and a piston upper part which is connected in an air-tight manner to the piston lower part and which is in the form of a cover.

The piston lower part has a base and a rotationally symmetrical piston wall, that is, substantially a vertically running cylindrical or even slightly conical piston wall. The piston upper part has an annular region or cover wall adjoining the piston wall, and has further annular profiles and/or annular flanges for supporting the air spring rolling-lobe flexible member thereagainst and to provide an air-tight connection of the air spring rolling-lobe flexible member to the roll-off piston.

BACKGROUND OF THE INVENTION

Various types of such roll-off pistons are known in the prior art. Firstly, relatively heavy roll-off pistons exist which are made of steel sheet metal and which have a fully utilizable interior volume and an end stop, that is, a so-called buffer support, specifically a support for a stop buffer that acts substantially in the axial direction of the air spring. The roll-off piston made of steel sheet metal is produced as a deep-drawn part with a conical sealing seat for receiving the bellows, and has a welded-in base part with welded-on support tube. The entire component is accordingly heavy and is expensive to manufacture.

Secondly, there exist relatively lightweight, single-piece plastics pistons which have an unutilized or only partially utilized interior volume and an end stop (buffer support). A disadvantage of such constructions is a loss of comfort resulting from a small utilizable piston air volume. The suspension characteristic is then relatively hard.

Furthermore, the prior art also discloses two-part plastics pistons with a utilizable interior volume without buffer support.

EP 1 862 335 B1 discloses for this purpose an air spring piston which is made of a cup-shaped part and of a cover part, the parts being butt-welded in the region of the walls thereof. Here, the cup-shaped part has a base wall which has an insert for connecting to the vehicle axle. A disadvantage here is the lack of an end stop (buffer support).

United States patent application publication 2010/0127438 A1 discloses a plunger, in the form of a hollow body, for an air spring, the plunger being composed of two parts connected to one another in an air-tight manner, specifically of a cup-shaped lower part with a base and a shell and of an upper part. In this publication, too, no end stop is provided.

SUMMARY OF THE INVENTION

It is an object of the invention to provide a lightweight roll-off piston which is simple to produce and whose interior volume can be fully utilized for the suspension action and in which there is also integrated an end stop/a buffer support, that is, in which a combination of optimum air volume and comfort and the provision of an integrated internal end stop in the air spring system is achieved.

The roll-off piston of the invention is for an air spring including an air spring rolling-lobe flexible member defining an interior space. The roll-off piston is configured as a hollow plunger piston and defines an interior space communicating with the interior space of the flexible member. The air spring further defines an axial direction and includes an impact buffer. The roll-off piston includes: a pot-shaped lower part having a base and a rotationally symmetrical piston wall; an upper part configured as a cover and being connected air tight to the lower part; the upper part having an annular cover wall extending to the piston wall and having an annular profile configured to support the air spring rolling-lobe flexible member in an air tight manner on the roll-off piston; a support for accommodating the impact buffer acting essentially in the axial direction of the air spring; the support being integrated into the roll-off piston and including first and second support components; the upper part having an impact or receiving surface formed thereon so as to be arranged centrally within the rolling-lobe flexible member; the first support component being configured as a portion of the upper part of the roll-off piston and to support the impact or receiving surface; the upper part being further configured to support the impact or receiving surface for the impact buffer arranged thereon and within the rolling-lobe flexible member; the second support component being configured as a portion of the pot-shaped lower part and to extend from the base; and, the first support component and the second support component being configured to coact to take up forces acting essentially in the axial direction.

Here, a support (buffer support) for a stop buffer, which acts substantially in the axial direction of the air spring, is integrated in the roll-off piston. The support is made of two interacting parts.

Here, one part of the support is formed as part of the piston upper part and supports a stop surface or receiving surface, integrally formed in the piston upper part and arranged centrally within the air spring rolling-lobe flexible member, for a stop buffer arranged within the air spring rolling-lobe flexible member.

The other part of the support is formed as part of the pot-shaped piston lower part and so as to extend from the base thereof, wherein the two support parts interact so as to absorb substantially axially acting forces.

Thus, there is formed a two-part piston which includes an upper part, with integrated sealing cone for the air spring bellows and with the integrated upper part of the buffer support, and a pot-shaped lower part with the integrated lower part of the buffer support, wherein an air-tight connection of the upper part and lower part is provided so as to form the utilizable interior volume. In particular, if the piston is formed from plastic, that is, if the upper part, lower part and buffer support parts are produced from this material, a lightweight construction is attained which has very good strength characteristics.

By virtue of the fact that the piston lower part and piston upper part are connected to one another in an air-tight, that is to say fixed, manner but the two support parts integrated in the piston lower part and in the piston upper part "only" interact to absorb substantially axially acting forces, the result is a defined, statically determinate absorption of forces without the typical stresses within the component, which often cause damage under continuous loading in the case of plastics materials.

In one advantageous embodiment, the support parts are of tubular form and are arranged centrally within the roll-off piston. Short tubes have an enormously high load-bearing capacity even in the longitudinal direction, and are nevertheless, as hollow bodies, of very low weight.

This also applies, in particular, to a further advantageous embodiment in which the tubular interior space of the support parts is stiffened with rib-like stiffening elements. It is thus also possible for transverse forces or obliquely acting buffer forces to be absorbed without problems. With such a configuration, it is also possible for the wall thickness of the tubular support parts to be further reduced if appropriate.

In further advantageous embodiments, this effect is yet further enhanced in that the rib-like stiffening elements are arranged in a stellate or radial manner, and in that rib-like stiffening elements are also provided in the annular chambers between the respective support part and piston wall or cover wall.

According to a further advantageous embodiment, the air-tight connection between the piston lower part and piston upper part is in the form of a welded or screw connection, if appropriate with a seal, on the outer piston jacket, that is on the outer circumference of the roll-off piston, that is, on the piston wall, and not on the base or in the cover region. Specifically in the case of plastics, what is particularly practical here is the easy-to-realize butt-welding process using friction welding or ultrasound welding. Thus, an air-tight connection of the upper part and lower part to form the interior volume is attained in a simple manner and without cumbersome assembly apparatuses.

According to a further advantageous embodiment, the support parts which interact so as to absorb substantially axially acting forces are connected to one another in a positively locking or resilient manner. Positively locking connections of the upper and lower parts of the buffer support, for example in the form of interlocking gap cross sections in the shape of spherical caps, concave-convex shapes or steps in the wall/tube wall, can transmit axial pressure forces, and also to a certain extent transverse forces or torques associated with axial forces, without generating an unfavorable loading situation or stresses in the component as a whole.

As a result of the interaction of the connection of the support parts with the air-tight connection, which is likewise provided and which is in the form of a welded or screw connection, between the piston lower part and piston upper part, particular attention must be paid to eliminating such stresses. It is also possible in an equivalent manner for the support parts to be connected to one another in a cohesive or non-positively locking manner such that substantially only an interaction for the absorption of axial forces takes place, but such a configuration requires extremely precise and accurate dimensional tolerances of the components and also a corresponding adaptation of the geometric and material-specific design in the connecting regions or in the vicinity thereof, for example for the purpose of transverse-force compensation et cetera. In this way, however, the design outlay and the costs for a roll-off piston of the type increase.

According to a further advantageous embodiment, the base of the piston lower part has at least one connecting element for the connection of the roll-off piston to a chassis or body. In this way, it is possible in a simple manner to realize a means for securing against "lift-off" of the roll-off piston.

According to a further particularly simple embodiment, which is advantageous for a reliable introduction of force, a connecting element is arranged centrally in the region of the support part. Thus, in most cases, a single connecting element is adequate.

According to a further embodiment, which is advantageous with regard to a reliable transmission of force to adjacent metallic components, the connecting element is in the form of a metallic threaded bushing injection-molded into the plastics material or of a metallic threaded bolt injection-molded into the plastics material.

According to a further advantageous embodiment, the base of the piston lower part is provided with a dome-shaped set-back portion. Such a set-back portion in the piston base permits the transmission of pressure forces and transverse forces without further connecting elements, for example, connecting elements made of metal, and produces an annular force-transmission surface which, in interaction with a connecting element arranged centrally in the region of the support part, is also suitable for absorbing tilting torques transversely with respect to the axis. Furthermore, such a set-back portion advantageously also serves for centering during assembly.

According to a further advantageous embodiment the stop buffer arranged within the air spring bellows is connected to the stop surface or receiving surface, which is integrally formed in the piston upper part and which is arranged centrally within the air spring rolling-lobe flexible member on the upper part of the support. Thus, the assembly or construction outlay for the air spring cover is reduced, and/or the upper air spring plate and the roll-off piston can be supplied as one component together with the stop buffer (reduction in the number of individual parts). It is self-evidently also possible, as has hitherto been conventional in similar designs in the prior art, for the stop buffer to be arranged on the inner side of the air spring cover situated opposite the stop surface or receiving surface.

The roll-off piston according to the invention can particularly advantageously be used in an air spring device for a vehicle.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
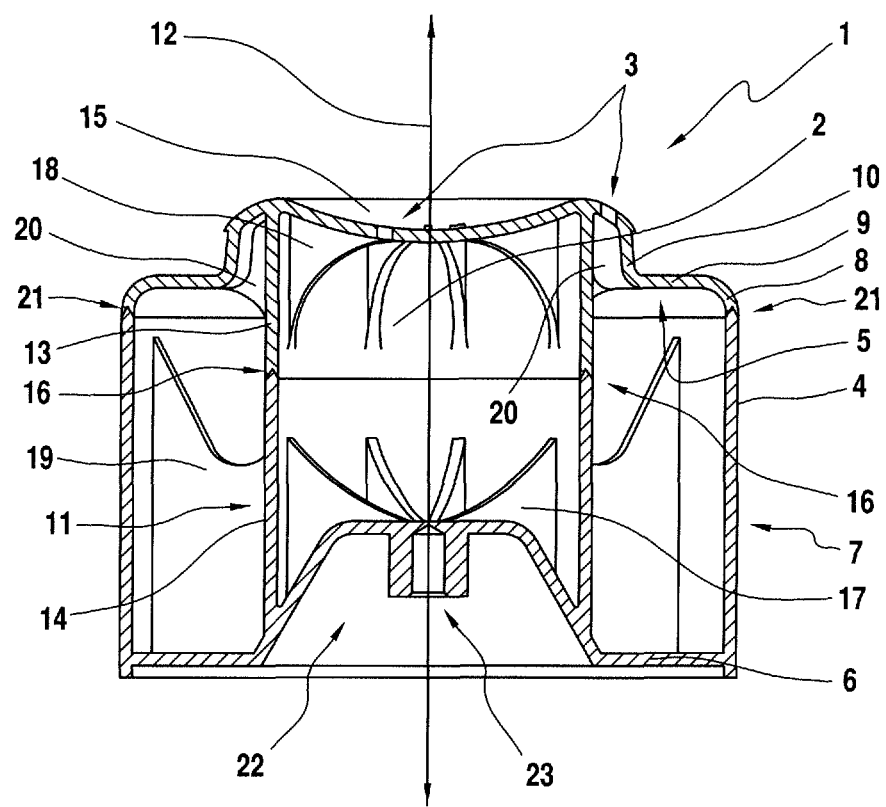
FIG. 1 shows a roll-off piston for an air spring according to the invention.

FIG. 1 shows a roll-off piston 1 for an air spring rolling-lobe flexible member. The roll-off piston is in the form of a hollow plunger. The interior space 2 of the roll-off piston communicates with the interior space of the air spring via the bores 3 arranged on the outer shoulder and in the stop surface or receiving surface 15.

The roll-off piston 1, which is manufactured entirely from plastic, is made of two parts 4 and 5, specifically from a pot-shaped piston lower part 4 and from a piston upper part 5 which is connected in an air-tight manner to the piston lower part 4 and which is in the form of a cover.

The piston lower part 4 has a base 6 and has a rotationally symmetrical piston wall 7. The piston upper part 5 has an annular region 8, that is a cover wall, adjoining the piston wall 7 of the base. The piston upper part 5 has a further annular profile 9 and an annular flange 10 for support of the air spring rolling-lobe flexible member and to provide an air-tight connection of the air spring rolling-lobe flexible member to the roll-off piston 1.

A support 11 is integrated into the roll-off piston 1 in the form of a buffer support for a stop buffer which acts substantially in the axial direction 12 of the air spring and which is situated on the air spring cover. Neither the stop buffer nor the air spring cover is illustrated in any more detail here. The buffer support 11 is made of two interacting tubular support parts 13 and 14 and is arranged centrally within the roll-off piston 1.

The upper support part 13 is formed as part of the piston upper part 5 and supports a stop surface or receiving surface 15, integrally formed in the piston upper part 5 and arranged centrally within the air spring rolling-lobe flexible member, for the stop buffer arranged within the air spring bellows.

The other, lower support part 14 is formed as part of the pot-shaped piston lower part 4 and so as to extend from the base 6 thereof.

The two support parts 13 and 14 interact so as to absorb substantially axially acting forces, and are connected to one another in a positively locking manner via opposing and interlocking concave-convex shapes. The connection 16 is in this case formed as a spherical cap or depression which runs over the wall thickness cross section of the support wall of the upper support part 13, into which spherical cap or depression there engages a conically projecting cross-sectional formation provided in the opposite support wall of the lower support part 14.

The tubular interior space of the support parts 13 and 14 is stiffened via rib-like stiffening elements 17 and 18 arranged in a stellate manner.

Likewise, radial rib-like stiffening elements 19 and 20 are arranged in the annular spaces between the respective support parts 13 and 14 and the piston wall 7 or cover wall 8, the annular profile 9, and/or the annular flange 10.

The air-tight connection between the piston lower part 4 and piston upper part 5 is realized here in the form of a butt-welded connection 21 of the piston walls 7 and 8 on the outer piston jacket. The butt-welded connection 21 is also of spherical-cap-shaped form here.

The base 6 of the piston lower part 4 is provided with a dome-shaped set-back portion 22 and with a recess/bore 23 for receiving a connecting element for the connection of the roll-off piston 1 to the chassis, such that the connecting element is arranged centrally in the region of the support part 14.

Figure 2:
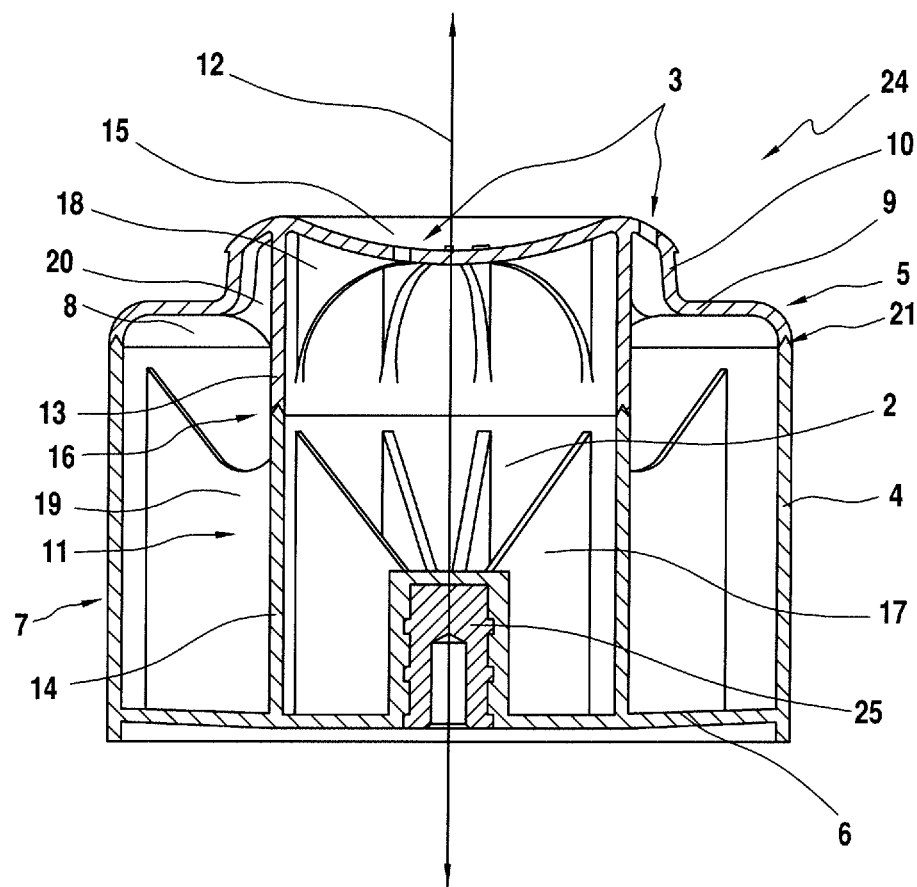
FIG. 2 shows a further similar configuration of a roll-off piston according to the invention; and, FIG. 3 shows an assembly of parts of a suspension arrangement having a roll-off piston according to the invention as per FIG. 1.

FIG. 2 shows a further, similar configuration of a roll-off piston 24 according to the invention without a dome-shaped set-back portion, wherein the connecting element is in the form of a metallic threaded bolt 25 injection-molded into the plastics material of the piston.

Figure 3:
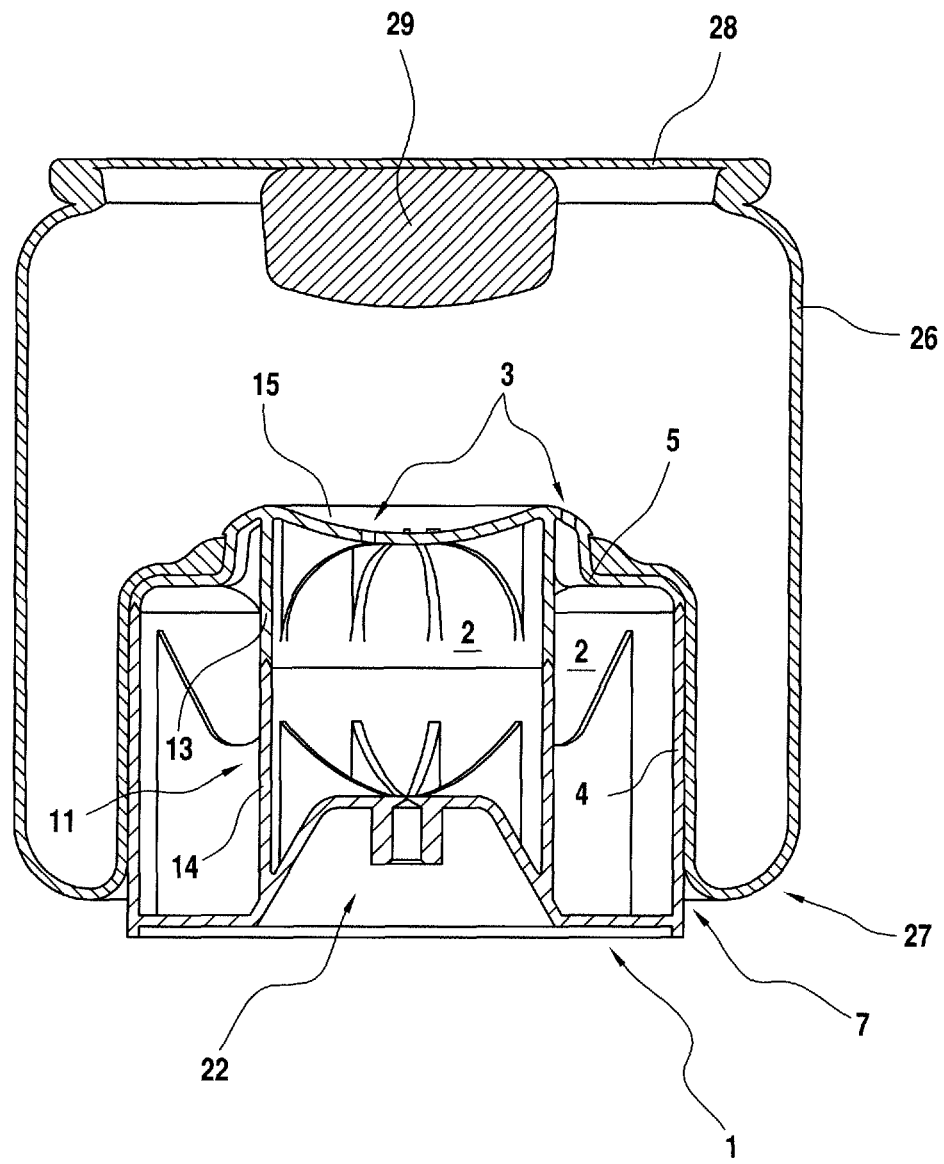

FIG. 3 shows an assembly of parts of a suspension arrangement for an air spring device for a vehicle, having the roll-off piston 1 as per FIG. 1.

On the piston upper part 5, the air spring rolling-lobe flexible member 26 is connected in an air-tight manner to the roll-off piston 1 in the form of a plunger, and, during spring compression and spring extension movements, the air spring rolling-lobe flexible member rolls, such that a rolling lobe 27 is formed, on the outer circumference or on the piston wall 7 of the roll-off piston 1.

The air spring rolling-lobe flexible member 26 has an air spring cover 28 to which there is fastened a stop buffer 29 made of elastic material. In the event of intense spring compression the stop buffer interacts with the stop surface or receiving surface 15 integrally formed in the piston upper part 5.

Here, the air spring cover 28 is connected to a chassis (not shown), and the base 6 or dome-shaped set-back portion 22 of the roll-off piston 1 is connected to a corresponding chassis part of a vehicle.

It is understood that the foregoing description is that of the preferred embodiments of the invention and that various changes and modifications may be made thereto without departing from the spirit and scope of the invention as defined in the appended claims.

LIST OF REFERENCE NUMERALS (Part of the Description)
1 Roll-off piston
2 Interior space
3 Bores
4 Piston lower part
5 Piston upper part
6 Base
7 Piston wall
8 Annular region
9 Annular profile
10 Annular flange
11 Buffer support
12 Axial direction
13 Upper support part
14 Lower support part
15 Receiving surface for stop buffer
16 Spherical-cap-shaped connection
17 Stiffening element
18 Stiffening element
19 Stiffening element
20 Stiffening element
21 Butt-welded connection
22 Dome-shaped set-back portion
23 Bore for connecting element
24 Roll-off piston
25 Threaded bolt
26 Air spring rolling-lobe flexible member
27 Rolling lobe
28 Air spring cover
29 Stop buffer

What is claimed is:

1. A roll-off piston for an air spring including an air spring rolling-lobe flexible member defining an interior space, the roll-off piston being configured as a hollow plunger piston and defining an interior space communicating with the interior space of said flexible member and the air spring further defining an axial direction and including an impact buffer, the roll-off piston comprising:

a pot-shaped lower part having a base wall and a rotationally symmetrical piston wall;

an upper part configured as a cover and being connected air tight to said lower part;

said upper part having an annular cover wall extending to said piston wall and having an annular profile configured to support said air spring rolling-lobe flexible member in an air tight manner on said roll-off piston;

a support for accommodating said impact buffer acting essentially in the axial direction of the air spring;

said support being integrated into said roll-off piston and including first and second support components;

said upper part having a top wall defining an impact receiving surface formed thereon so as to be arranged centrally within said rolling-lobe flexible member;

said first support component being configured as a portion of said upper part of said roll-off piston and to support said impact or receiving surface;

said upper part being further configured to support said impact or receiving surface for said impact buffer arranged thereon and within said rolling-lobe flexible member;

said second support component being configured as a portion of said pot-shaped lower part and to extend from said base wall;

said first support component and said second support component being configured to coact to take up forces acting essentially in said axial direction;

said first support component and said second support component being configured to conjointly form an annular buffer support wall arranged inside the roll-off piston so as to be concentric with said piston wall;

said buffer support wall defining a hollow tubular interior and extending in said axial direction from said top wall directly to said base wall of said pot-shaped lower part;

a plurality of reinforcing elements configured to reinforce said buffer support wall in said hollow tubular interior;

said base wall of said lower part having a dome-shaped set-back including a conical wall portion formed to be recessed inwardly into said interior space of said roll-off piston; and, a recess bottom wall portion extending from said conical wall portion;

a connector disposed at said recess bottom wall portion in spaced relationship to said conical wall portion;

said connector being configured to permit attachment of said pot-shaped lower part to a chassis of a motor vehicle; and, said dome-shaped set-back and said connector conjointly defining an arrangement for absorbing tilting forces acting transversely with respect to said axial direction.

2. The roll-off piston of claim 1, wherein the roll-off piston is made of plastic.

3. The roll-off piston of claim 1, wherein said first support component and said piston wall conjointly define a first annular space, said second support component and at least one of said piston wall and said cover wall conjointly define a second annular space, the roll-off piston further comprising:
a first plurality of reinforcing elements arranged in said first annular space; and,
a second plurality of reinforcing elements arranged in said second annular space.

4. The roll-off piston of claim 1, wherein said first support component and said piston wall conjointly define a first annular space, said second support component and at least one of said piston wall and said cover wall conjointly define a second annular space, the roll-off piston further comprising:
a plurality of reinforcing elements arranged in said first annular space; and,
a plurality of reinforcing elements arranged in said second annular space.

5. The roll-off piston of claim 1, wherein said plurality of reinforcing elements are arranged in one of a stellate and a radial manner.

6. The roll-off piston of claim 4, wherein the pluralities of reinforcing elements are arranged in one of a stellate and a radial manner.

7. The roll-off piston of claim 1, wherein:
said upper part and said lower part conjointly define an outer piston jacket; and,
said air-tight connection is configured as one of a welded connection and a threaded fastener connection on said outer piston jacket.

8. The roll-off piston of claim 1, wherein said first and said second support components are interconnected in one of a form fit and resilient manner.

9. The roll-off piston of claim 1, wherein said base wall of said lower piston part has at least one connecting element configured to connect the roll-off piston to a chassis or a body of a vehicle.

10. The roll-off piston of claim 9, wherein one of said at least one connecting elements is arranged centrally in the region of said support component.

11. The roll-off piston of claim 9, wherein:
said upper part and said lower part are made of plastic material; and,
said connecting element is configured as one of a metallic threaded bushing injection molded into said plastic material and a threaded bolt injection molded into said plastic material.

12. The roll-off piston of claim 1, wherein said impact buffer is connected to one of said surface and an air spring cover disposed opposite to said impact buffer.

13. An air spring for a vehicle, said air spring defining an axial direction and comprising:
a rolling-lobe flexible member defining an interior space;
an impact buffer; and,
a roll-off piston including:
a pot-shaped lower part having a base wall and a rotationally symmetrical piston wall;
an upper part configured as a cover and being connected air tight to said lower part;
said upper part having an annular cover wall extending to said piston wall and having an annular profile configured to support said air spring rolling-lobe flexible member in an air tight manner on said roll-off piston;
a support for accommodating said impact buffer acting essentially in the axial direction of the air spring;
said support being integrated into said roll-off piston and including first and second support components;
said upper part having a top wall defining an impact receiving surface formed thereon so as to be arranged centrally within said rolling-lobe flexible member;
said first support component being configured as a portion of said upper part of said roll-off piston and to support said impact or receiving surface;
said upper part being further configured to support said impact or receiving surface for said impact buffer arranged thereon and within said rolling-lobe flexible member;
said second support component being configured as a portion of said pot-shaped lower part and to extend from said base wall;
said first support component and said second support component being configured to coact to take up forces acting essentially in said axial direction;
said first support component and said second support component being configured to conjointly form an annular buffer support wall arranged inside the roll-off piston so as to be concentric with said piston wall;

said buffer support wall defining a hollow tubular interior and extending in said axial direction from said top wall directly to said base wall of said pot-shaped lower part;

a plurality of reinforcing elements configured to reinforce said buffer support wall in said hollow tubular interior;

said base wall of said lower part having a dome-shaped set-back including a conical wall portion formed to be recessed inwardly into said interior space of said roll-off piston; and, a recess bottom wall portion extending from said conical wall portion;

a connector disposed at said recess bottom wall portion in spaced relationship to said conical wall portion;

said connector being configured to permit attachment of said pot-shaped lower part to a chassis of a motor vehicle; and, said dome-shaped set-back and said connector conjointly defining an arrangement for absorbing tilting forces acting transversely with respect to said axial direction.

* * * * *